(12) United States Patent
Tischer et al.

(10) Patent No.: US 12,078,684 B2
(45) Date of Patent: Sep. 3, 2024

(54) ACCURATE ESTIMATION OF BATTERY CHARGE REMAINING IN A MOBILE CART

(71) Applicant: Ergotron, Inc., St. Paul, MN (US)

(72) Inventors: William Dale Tischer, Shoreview, MN (US); Troy Edward Townes, Marietta, GA (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 18/233,711

(22) Filed: Aug. 14, 2023

(65) Prior Publication Data
US 2023/0384383 A1 Nov. 30, 2023

Related U.S. Application Data

(63) Continuation of application No. 17/760,698, filed as application No. PCT/US2021/035717 on Jun. 3, 2021, now Pat. No. 11,762,025.

(60) Provisional application No. 63/066,976, filed on Aug. 18, 2020, provisional application No. 63/034,467, filed on Jun. 4, 2020.

(51) Int. Cl.
*H02J 7/00* (2006.01)
*G01R 31/371* (2019.01)
*G01R 31/382* (2019.01)

(52) U.S. Cl.
CPC ......... *G01R 31/382* (2019.01); *G01R 31/371* (2019.01); *H02J 7/0048* (2020.01)

(58) Field of Classification Search
CPC .... G01R 31/382; G01R 31/371; H02J 7/0048
USPC ....................................................... 324/432
See application file for complete search history.

(56) References Cited

U.S. PATENT DOCUMENTS

| 11,560,066 B2 | 1/2023 | Ferguson et al. |
| 11,762,025 B2 | 9/2023 | Tischer et al. |
| 2008/0055826 A1 | 3/2008 | Smith et al. |
| 2011/0193524 A1 | 8/2011 | Hazzard et al. |
| 2012/0005490 A1 | 1/2012 | Goraczko et al. |

(Continued)

FOREIGN PATENT DOCUMENTS

| CN | 107077776 A | 8/2017 |
| CN | 108327721 A | 7/2018 |

(Continued)

OTHER PUBLICATIONS

"U.S. Appl. No. 17/760,698 Preliminary Amendment Field with Application", 10 pgs.

(Continued)

*Primary Examiner* — Nathaniel R Pelton
(74) *Attorney, Agent, or Firm* — Schwegman Lundberg & Woessner, P.A.

(57) ABSTRACT

Systems and methods for monitoring and management of an electronic device are discussed here. An authentication request is received from a user for access to an electronically secured compartment of an electronic device. Authentication data is obtained from the user. An authentication request that includes a device identifier for the electronically secured compartment and the authentication data is transmitted to a cloud-based authentication service. Access to the electronically secured compartment is provided upon receipt of an indication of an association between the user and the electronically secured compartment from the cloud-based service provider.

20 Claims, 11 Drawing Sheets

(56) References Cited

U.S. PATENT DOCUMENTS

| | | | |
|---|---|---|---|
| 2014/0277707 | A1 | 9/2014 | Akdogan et al. |
| 2015/0223891 | A1 | 8/2015 | Miller et al. |
| 2016/0214489 | A1 | 7/2016 | Giusti et al. |
| 2016/0261122 | A1 | 9/2016 | Childress et al. |
| 2017/0005512 | A1 | 1/2017 | Boyd |
| 2019/0178997 | A1 | 6/2019 | Lombrozo et al. |
| 2020/0192459 | A1 | 6/2020 | Flores Assad et al. |
| 2020/0284842 | A1* | 9/2020 | Endo .................. B60L 58/12 |
| 2020/0286312 | A1* | 9/2020 | Wilson ............ H04M 1/72412 |
| 2020/0387844 | A1 | 12/2020 | Tischer et al. |
| 2021/0267707 | A1* | 9/2021 | Sung .................... G16H 40/67 |
| 2021/0326147 | A1* | 10/2021 | Shelton ................ G06Q 20/18 |
| 2022/0227229 | A1 | 7/2022 | Nishida |
| 2022/0355702 | A1 | 11/2022 | Nishikawa et al. |
| 2023/0022353 | A1 | 1/2023 | Ryu |
| 2023/0028502 | A1 | 1/2023 | Tischer et al. |

FOREIGN PATENT DOCUMENTS

| | | |
|---|---|---|
| CN | 116235170 A | 6/2023 |
| CN | 116644397 A | 8/2023 |
| DE | 112021002692 T5 | 3/2023 |
| DE | 112021002692 B4 | 9/2023 |
| EP | 1870832 B1 | 9/2009 |
| WO | WO-2019169191 A1 | 9/2019 |
| WO | WO-2021247874 A1 | 12/2021 |

OTHER PUBLICATIONS

"U.S. Appl. No. 17/760,698, Non Final Office Action dated Feb. 10, 2023", 9 pgs.

"U.S. Appl. No. 17/760,698, Notice of Allowance dated Jun. 8, 2023", 7 pgs.

"U.S. Appl. No. 17/760,698, Preliminary Amendment filed Jun. 9, 2022".

"U.S. Appl. No. 17/760,698, Response filed May 10, 2023 to Non Final Office Action dated Feb. 10, 2023", 8 pgs.

"Chinese Application Serial No. 202180058130.9, Notification to Make Rectification dated Apr. 18, 2023", W/O English Translation, 1 page.

"Chinese Application Serial No. 202180058130.9, Response filed May 18, 2023 to Notification to Make Rectification dated Apr. 18, 2023", w/o Claims, 3 pgs.

"German Application Serial No. 112021002692.5, Office Action dated Feb. 1, 2023", w/o English Translation, 5 pgs.

"German Application Serial No. 112021002692.5, Response filed May 23, 2023 to Office Action dated Feb. 1, 2023", w/o english claims, 11 pgs.

"International Application Serial No. PCT/US2021/035717, International Preliminary Report on Patentability dated Dec. 15, 2022", 11 pgs.

"International Application Serial No. PCT/US2021/035717, International Search Report dated Nov. 4, 2021", 5 pgs.

"International Application Serial No. PCT/US2021/035717, Invitation to Pay Additional Fees dated Aug. 4, 2021", 2 pgs.

"International Application Serial No. PCT/US2021/035717, Written Opinion dated Nov. 4, 2021", 10 pgs.

"Chinese Application Serial No. 202180058130.9, Office Action mailed Oct. 21, 2023", w/ English Translation, 21 pgs.

"Chinese Application Serial No. 202180058130.9, Response filed May 14, 2024 to Office Action mailed Oct. 21, 2023", w/ english claims, 9 pgs.

\* cited by examiner

ACCURATE ESTIMATION OF BATTERY CHARGE REMAINING IN A MOBILE CART

PRIORITY

This application is a continuation of U.S. application Ser. No. 17/760,698, filed Mar. 15, 2022, which is a U.S. National Stage of PCT Application Serial No. PCT/US2021/035717, filed on Jun. 3, 2021, which was published as WO 2021/247874 A1 on Dec. 9, 2021, which claims the benefit of priority to U.S. Provisional Patent Application Ser. No. 63/034,467, filed Jun. 4, 2020, and U.S. Provisional Patent Application Ser. No. 63/066,976, filed Aug. 18, 2020 which are incorporated by reference herein in their entirety.

TECHNICAL FIELD

Embodiments described herein generally relate to functional monitoring of an electronic device, in some embodiments, more specifically electronic telemetry-based monitoring of an electronic device including accurate estimation of battery charge remaining in a mobile cart.

BACKGROUND

Electronic devices such as computer carts, electronic cabinets, electronic tables, etc. may include a variety of electronic components. The electronic components may have operational limitations that may vary based on usage of the electronic device. It may be desired to monitor the operational state and usage of the electronic device to determine when service may be necessary for an electronic component.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
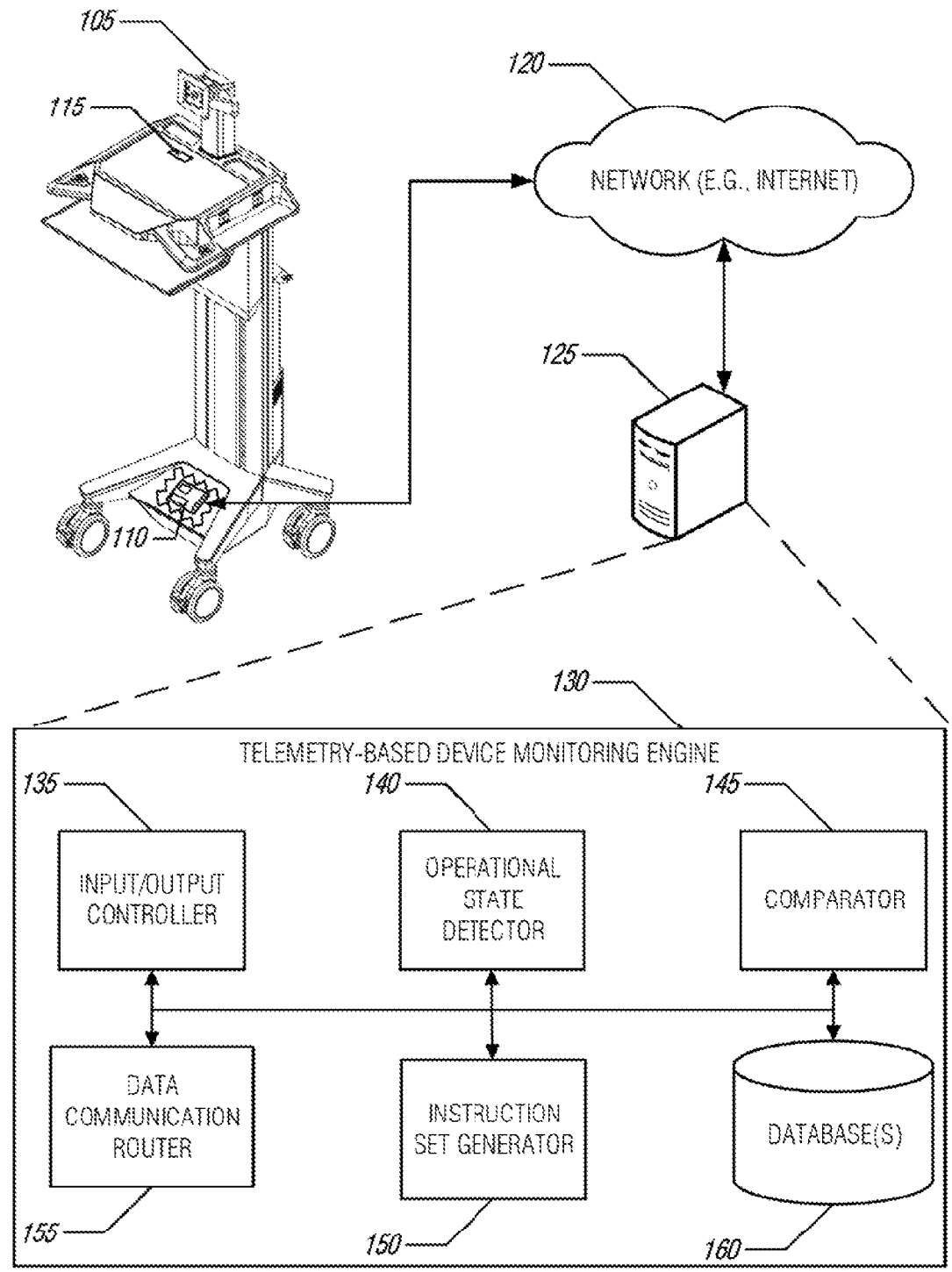
FIG. 1 is a block diagram of an example of an environment and a system for electronic telemetry-based monitoring of an electronic device, according to an embodiment.

Data collected from sensors located on machines may be used to make decisions about a function of a machine in a factory setting to improve yield, decide when to replace a part due to a predicted malfunction, etc. With the revolution of IoT (Internet of Things), there is an even larger push of automation improvement using remote connection to sensors over the Internet. However, limiting this technology to machine-to-machine or machine-to-technician communication is missing the potential for the Internet of Things. Using the machine data to support future sales, enhance relationships with customers, improve products, as well as improve the customer's experience with manufacturers and products by predictive maintenance based on actual number of cycles or time until a component will fail may greatly reduce the customer's downtime because the maintenance may be performed proactively on a customer's schedule rather than after the component has failed and the product is no longer functional.

Along with these predictive metrics comes the benefit of using sensor data to determine if a component is over or under-engineered based on real-world usage of the product by the customer. Costs may potentially be reduced if a component is too robust—and conversely cost may be needed to increase to improve a component that fails prematurely which will ultimately be less expensive than replacing poorly designed parts or customer field returns. However, without knowing the actual uses and environments that the product may be subjected to, everything engineers develop would be a guess. With sensor data and data analysis, patterns of usage and other analytics may be used to improve products, reduce cost, increase sales, and improve the customer's experience with a no-touch required viewpoint. The customer does not have to do anything to provide the data designers need—it may all be handled automatically. And, with the improvements made in engineering, sales, and customer experience, the value of the product now has many more times the gains with data than just the product itself. This disclosure describes techniques to implement a sensor-based customer-enhancing experience.

In accordance with various techniques of this disclosure, one or more sensors may be placed in and around the product. By way of a specific non-limiting example, the product may be a medical cart used for Electronic Medical Records (EMR) data entry or medication delivery, such as aspirin or other non-narcotic medications. The sensors may be used to monitor the temperature of the room, the barometric pressure of the room, the voltage of the cart's on-board batteries, the current providing power to the on-board inverter that provides 50 or 60-Hz 120 or 230-VAC to the user's computer and monitor attached to the cart.

In some example implementations, charge and discharge cycles of the battery may be counted so that a State of Health (SoH) of the battery may be determined. For example, a typical lithium iron phosphate (LiFE) battery chemistry may have approximately 1800 charge/discharge cycles available before the battery may need to be replaced. As another example, it may be undesirable for a bright light on the cart's display or floor to disturb a sleeping patient if the room is dark. In accordance with this disclosure, sensors that interact with the room, e.g., light sensors, may control the lighting on the cart's display or external cart floor lighting based on the room's ambient lighting. Similarly, the floor lighting may be dimmed appropriately. These are just a few examples of the number and types of sensors that may be used to provide what may be valuable customer insights into the use of the product and other benefits not directly related to the basic use of the product, e.g., a medical records/medication delivery cart.

Next, the data may be transmitted from the sensors to a database for collection. In some example implementations, Wi-Fi may be a suitable transport method for hospitals, businesses and homes. Message Queuing Telemetry Transport (MQTT) is a method of organizing the data into small packets for transmission over low-power devices that rely on battery power and is ideally suited for machine-to-machine exchange of information. Using MQTT and a publish-subscribe model may keep the overhead for network and power at a minimum.

For example, only devices needing to hear what is going on will get the message and devices will only send their information when they need to. For example, the Wi-Fi transmitter in the cart may only energize and send information when something changes (voltage, current, battery cycle, etc.) thus eliminating the old method of polling the device for information. Meaning the device (in this case a cart) was always listening for a request to send information to a server. In the publish-subscribe model the cart may wake up its Wi-Fi transmitter when it needs to say something and then go back to sleep. Those things that need to hear what is going on are always listening and not power or bandwidth constrained and may then act accordingly upon receiving the information.

Once the information is received, the data may be stored, acted upon, discarded, or whatever the need is for the given sensor information. For example, in one implementation the battery charge/discharge cycle count may be coming close to the maximum number of charge and discharge cycles on a battery chemistry before the battery will need replacing. The sensor count information may be published, the data then may be saved to a database in the "cloud" such as Amazon Web Services (AWS), Microsoft Azure, etc. where an application connected to the company's Customer Relationship Manager (CRM) software (such as Salesforce) makes decisions about what should happen based on the data.

For example, in the case of the battery charge/discharge cycle count coming close to its limit of 1800 cycles, the cycle count sensor information may be sent to the Cloud system and then to the CRM system. The CRM system may be triggered to automatically send a message to the hospital customer saying that the battery on cart number A123456 is going to need replacement in the next 7-days and that a battery has been ordered to be installed on Thursday at 2:00 pm. If that time is not convenient, please respond with an alternate date and time. At the same time, the service provider may be notified by the CRM system what work needs to be performed, a map to the hospital, location of the cart, and tracking number of the battery that was ordered automatically by the CRM system talking to the Enterprise Resource Planning (ERP) system and parts are on its way.

After battery replacement, the sensors on the cart may let the CRM system know all is well. Invoicing or warranty paperwork may be generated as well as a thank-you note to the customer letting them know all is well. All of this occurred with predicative down-time to the customer and without the potentially-upset customer calling to say their cart is broken followed by guesses by Customer Service about what may be wrong with the cart followed by conversations with the customer and the Technical Support people or even Engineering about what is going on to help solve the problem. By adding a sensor, a database, connecting the database to a CRM and ERP system, and through the Internet, a powerful customer experience is created.

Ultimately the benefit of this customer no-touch experience is a great customer experience, improvement of the technical capabilities with respect to product improvements based on real-world data, and ultimately reduction in costs to a design and manufacturing organization throughout the entire product life-cycle. Other benefits not directly related to the product but certainly may be realized are the use of the sensor data for non-cart information decisions. For example, nurse workflow improvement studies by hospital administrators based on sensors on the cart may be realized. Sensors that indicate motion and non-motion, worksurface position, room lighting, and others may be used to indicate working habits of nurses on an aggregate scale across the organization or down to individuals. These are just two simple examples of what may be done with the sensor data to bring expanded usefulness and customer satisfaction.

Figure 3:
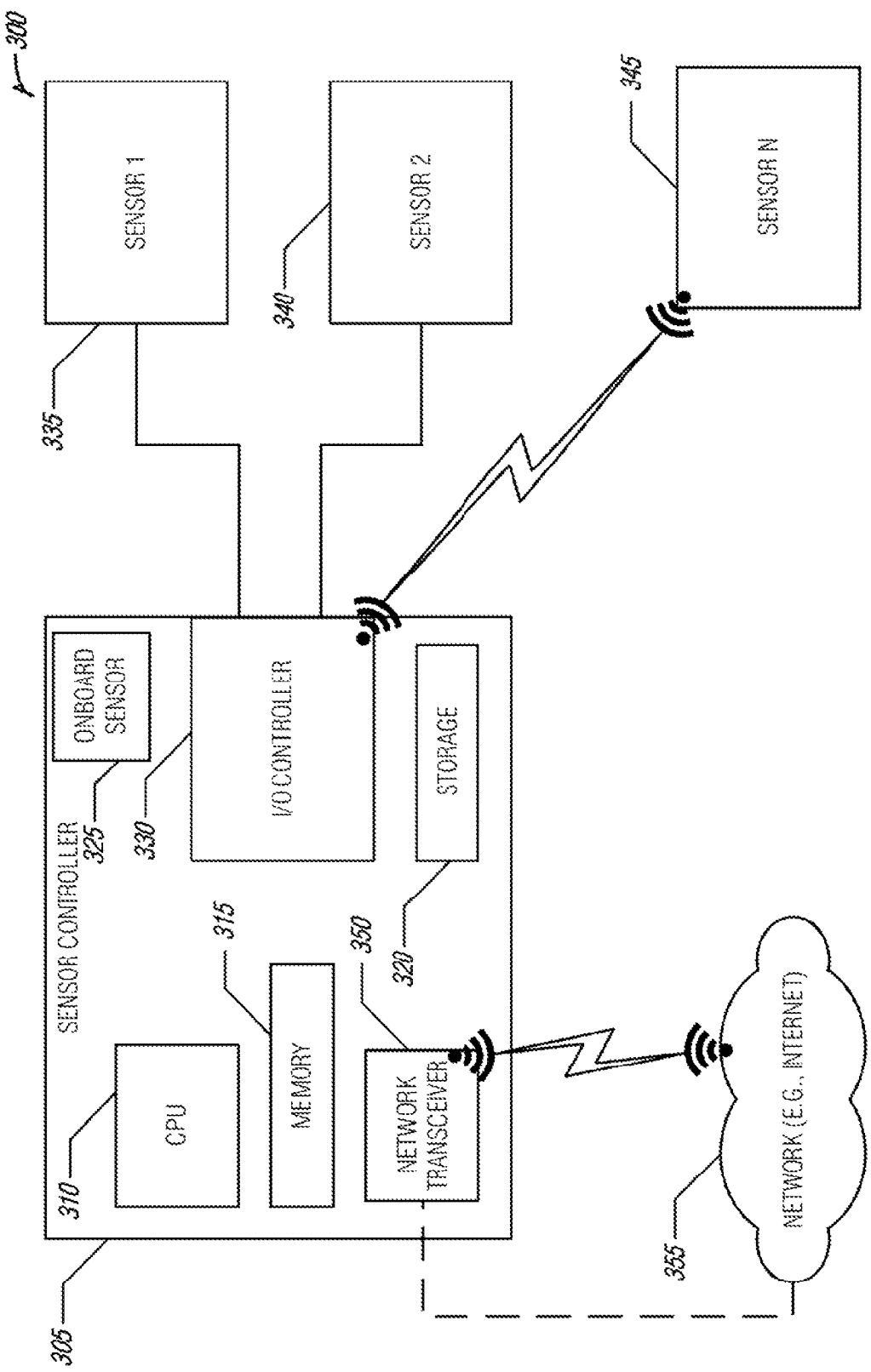
FIG. 3 is a block diagram of an example of a sensor network for electronic telemetry-based monitoring of an electronic device, according to an embodiment.

FIG. 1 is a block diagram of an example of an environment 100 and a system 130 for accurate estimation of battery charge remaining in a mobile cart, according to an embodiment. The environment 100 may include an electronic device 105 (e.g., an electronic computer cart, electronic storage cabinet, and electronic table, etc.) that includes a variety of sensors 115 (e.g., ambient light sensor, air quality sensor, a radioactivity sensor, a radiation sensor, a lighting sensor, a magnetic field sensor, a sit-stand worksurface height sensor, a height adjustment cycle sensor, a vibration sensor, an inertia, a power on/off state sensor, a voltage sensor, a temperature sensor, a current sensor, a battery cycle sensor, a drawer state sensor, a contact sensor, a barometric pressure sensor, a fault status sensor, a wireless networking operational sensor, odometer, decibel meter, oxygen sensor, motion sensor, pressure sensor, ultrasonic sensor, etc.) configured in a sensor array communicatively coupled (e.g., via a sensor network, wired connection, wired network, wireless network, short-wave radio, nearfield communication, etc.) to a sensor controller 110. A more detailed example of a sensor controller is shown in FIG. 3. The electronic device may operate in a variety of locations such as, for example, a medical treatment facility.

The sensor controller 110 may collect sensor data from the sensors and may transmit the sensor data to a cloud computing platform via the network 120 (e.g., the internet, cellular network, wired network, wireless network, etc.). The sensor data may be received by a network management server 125 (e.g., a single server, a server cluster, a system on a chip (SoC), a field-programmable gate array (FPGA), an application-specific integrated circuit (ASIC), a cloud computing platform service, etc.) via the network 120. In an example, the network management server 120 may be operating within the cloud computing platform and the cloud computing platform may facilitate transmission of the sensor data directly to the network management server 125 via the network 120.

The network management server 125 may be communicatively coupled (e.g., via wired network, wireless network, shared bus, etc.) to the system 130. In an example, the system 130 may be a telemetry-based device monitoring engine. The system 130 may include a variety of components such as an input/output controller 135, an operational state detector 140, a comparator 145, an instruction set generator 145, a data communication router 155, and database(s) 160. The components of the system 130 may be implemented in a single computing device (e.g., a server, FPGA, ASIC, SOC, a virtual server, etc.) or may be distributed across multiple computing devices (e.g., a server cluster, a cloud computing platform, a virtual server cluster, etc.).

The input/output controller 135 may obtain a set of sensor data from the sensor array included in the electronic device 105. In an example, the set of sensor data may be collected from the sensor array by the sensor controller 110 of the electronic device 105. The electronic device 105 may then transmit the set of sensor data to the cloud service platform of a cloud computing platform. The input/output controller 135 may obtain the set of sensor data from the cloud service platform. The input/output controller 135 may process (e.g., format, normalize, translate, etc.) the sensor data for use as input by other components in the system 130.

By way of example, and not limitation, the set of sensor data may include sensor readings from an ambient light sensor, air quality sensor, a radioactivity sensor, a radiation sensor, a lighting sensor, a magnetic field sensor, a sit-stand worksurface height sensor, a height adjustment cycle sensor, a vibration sensor, an inertia, a power on/off state sensor, a voltage sensor, a temperature sensor, a current sensor, a battery cycle sensor, a drawer state sensor, a contact sensor, a barometric pressure sensor, a fault status sensor, a wireless networking operational sensor, odometer, decibel meter, oxygen sensor, motion sensor, pressure sensor, ultrasonic sensor, etc. In an example, the battery cycle sensor may observe a number of charging cycles that a battery in the electronic device 105 has been completed. In another example, the voltage sensor may observe the voltage level of the input power and the internal power of the electronic device 105. In another example, the ambient light sensor may observe the ambient light of an environment where the electronic device 105 is operation. In another example, the height adjustment cycle sensor may observe a number of times a lift mechanism or corresponding motor have been activated. The foregoing examples represent nonlimiting examples of sensor data that may be included in the set of sensor data. It will be readily understood that the set of sensor data may include a variety of sensor data in varying combinations. The set of sensor data may be stored in the database(s) 160.

The operational state detector 140 may work in conjunction with the comparator 145 to determine an operational state of a component (e.g., battery, motor, controller, mechanism, electronic part, etc.) of the electronic device 105 based on an evaluation of the set of sensor data. In an example, the sensor array may include a cycle sensor (e.g., battery charge cycle sensor, lift mechanism cycle sensor, etc.) for the component. The evaluation of the set of sensor data may include a comparison of a number of cycles of the component observed by the cycle sensor to a cycle threshold for the component. Upon a determination that the number of cycles is at least equal to the cycle threshold, the operational state of the component may be determined to be end-of-life (e.g., should be replaced, etc.). For example, a battery included with the electronic device 105 may have a rated duty cycle of 1800 charging cycles and an observation from a battery cycle sensor in the electronic device 105 that indicates the battery has completed 1850 charging cycles may be compared to the rated duty cycle of 1800 cycles to determine that the battery is at or near end-of-life.

In an example, the operational state detector 140 may work in conjunction with the comparator 145 to predict a future failure of the component based on the evaluation of the set of sensor data. In an example, the evaluation may include a comparison of the set of sensor data to a predictive failure model for the component. For example, a machine learning model or other predictive model may be generated (e.g., trained, etc.) using training data to determine sets of sensor data that may indicate the future failure of the component. The set of sensor data may be provided as inputs to the predictive model which may then generate inputs including a likelihood of failure of the component and a predicted time before such failure is likely to occur. The predictive models may be stored in the database(s) 160.

The instruction set generator 150 may generate a set of instructions based on the operational state of the component. The data communication router 155 may determine a recipient computing device to receive the set of instructions based on a device identifier of the electronic device 105 and a task associated with set of instructions. The input/output controller 135 may transmit the set of instructions to the recipient computing device. In an example, the input/output controller 135 may format or otherwise modify the outputs for delivery to a particular recipient computing device. For example, the set of instructions may be translated into a script file, executable file, etc. based on the input requirements of the recipient computing device.

In an example, the task may be component fulfillment and the set of instructions may include instructions to transmit an electronic order for a replacement component to a supplier of the component and the recipient computing device may be an order processing computing system of the supplier. In another example, the task may be component replacement set of instructions may include instructions to transmit an electronic service workorder to a service provider of the electronic device 105 based on the device identifier of the electronic device 105 and the recipient computing device may be a workorder processing system of the service provider.

In another example, the recipient device may be a portable device associated with the device identifier and the set of instructions may include instructions that cause the portable device to display operational data for the electronic device 105 including the operational state of the component. In another example, the recipient device may be a computing device associated with an owner of the electronic device 105 based on the device identifier and the set of instructions may include instructions that cause the computing device associated with the owner to store operational data for the electronic device 105 including the operational state of the component. In yet another example, the recipient device may be a customer relationship management computing device and the set of instructions may include instructions that cause the customer relationship management computing device to store operational data for the electronic device 105 including the operational state of the component in a record associated with an owner of the electronic device 105 based on the device identifier.

Automated remote detection of the operational status of the electronic device 105 and the instruction delivery may reduce downtime of the electronic device 105 by dispatching replacement components, service, and parameter changes before an actual component failure. This may be critical in a healthcare environment as equipment downtime may compromise patient health and safety as well as the health and safety of medical professionals.

Figure 2:
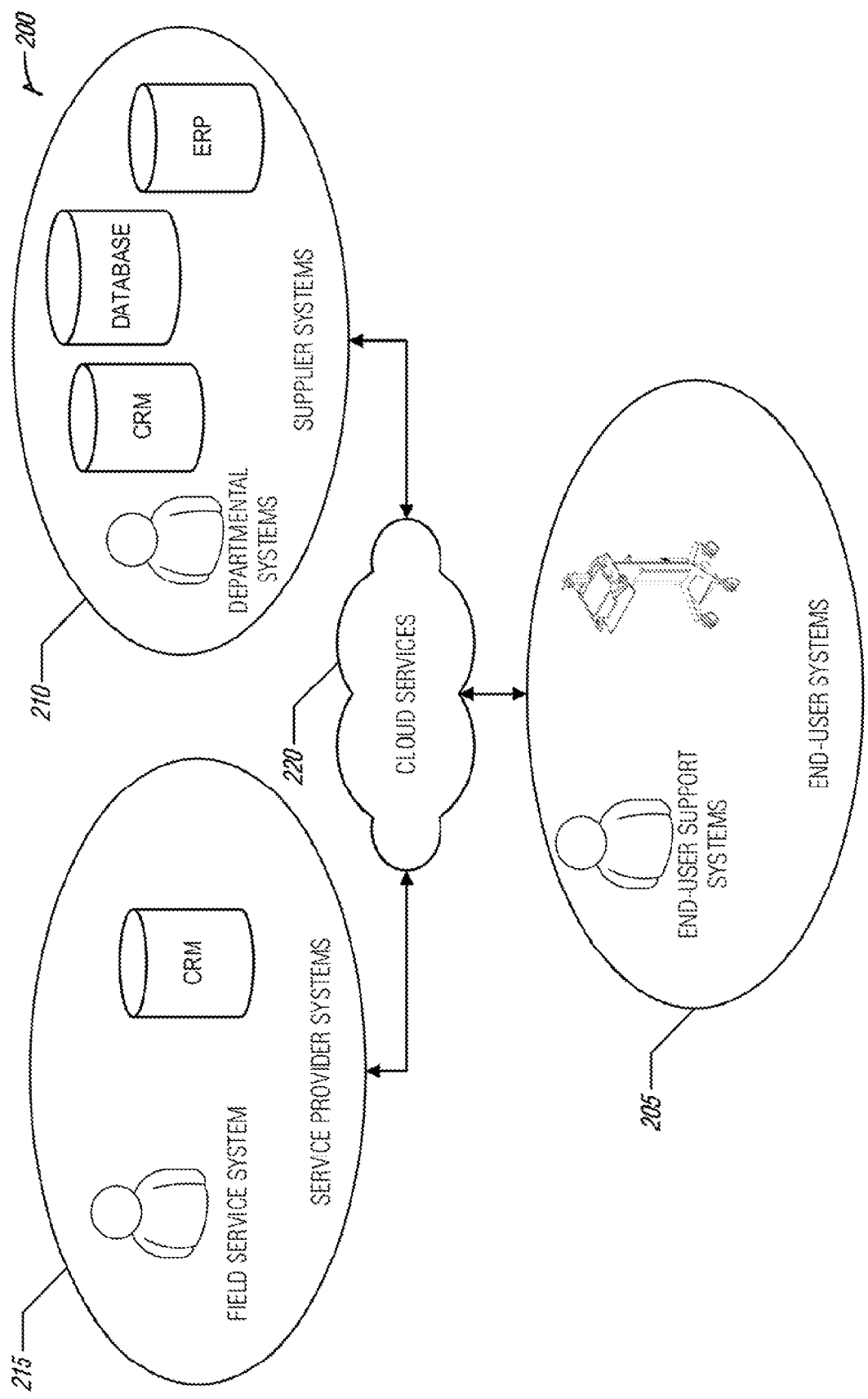
FIG. 2 is a block diagram of data network entities for electronic telemetry-based monitoring of an electronic device, according to an embodiment.

FIG. 2 is a block diagram of data network entities 200 for accurate estimation of battery charge remaining in a mobile cart, according to an embodiment. The data network entities 200 may transmit and receive data (e.g., sensor data, instructions, etc.) as described in FIG. 1.

The data network entities 200 may include end-user systems 205, supplier systems 210, service provider systems 215, etc. The end-user systems may include a variety of systems including electronic devices (e.g., electronic device 105, etc.), end-user support systems, etc. The supplier systems 210 may include a variety of systems including an enterprise resource planning (ERP) system, databases, a customer relationship management (CRM) system, departmental systems, etc. The end-user systems 205, the supplier systems 210, and the service provider systems 215 may be communicatively coupled via a cloud service platform 220. In an example, the cloud services platform 220 may include a network management server (e.g., network management server 125 as described in FIG. 1, etc.). In another example, the network management server may be a member of the end-user systems 205, the supplier systems 210, and/or the service provider systems 215.

The electronic devices may transmit (e.g., via wireless network, wired network, cellular network, etc.) a set of sensor data to the cloud service platform 220. The set of sensor data may describe operational status of one or more components of the electronic device. The set of sensor data may be evaluated to determine if the one or more components is operating outside of normal operating conditions or has an operational status that indicates remediation (e.g., component replacement, parameter adjustment, etc.) may be necessary. Based on the evaluation, instructions may be transmitted to one or more systems of the end-user systems 205, the supplier systems 210, and the service provider systems 215. The instructions may, individually or in combination, be designed to mitigate any anomalies in the operational status of the one or more components. In an example, the instructions may cause records of the operational status to be created in one or more systems of the end-user systems 205, the supplier systems 210, and the service provider systems 215. These records may be accessed in the future in troubleshooting an issue with the one or more components, future research and development of the one or more components, operational trend analysis of the one or more components, etc.

FIG. 3 is a block diagram of an example of a sensor network 300 for accurate estimation of battery charge remaining in a mobile cart, according to an embodiment. The sensor network 300 may provide features as described in FIGS. 1 and 2.

The sensor network 300 may include a sensor controller 305. The sensor controller 305 may include a variety of component including a processor 310 (e.g., element 502 as described in FIG. 5, etc.), memory 315 (e.g., elements 504, 506 as described in FIG. 5, etc.), storage 320 (e.g., element 516 as described in FIG. 5, etc.), an onboard sensor 325 (e.g., embedded physical sensor, embedded logical sensor, etc.), and an input/output controller 330 (e.g., elements 512, 528 as described in FIG. 5, etc.).

The sensor network 300 may include a sensor array that may include the onboard sensor 325, a first sensor 335, a second sensor 340, and additional n sensors 345. The sensors may be communicatively coupled (e.g., via wired network, wireless network, shared bus, cellular network, short-wave radio, etc.) to the sensor controller 305 via the input/output controller.

The memory 315 may include instructions for causing the processor 310 to collect sensor data (e.g., sensor readings, etc.) from the sensors of the sensor array and may store the sensor data in storage 320. The network transceiver 350 may transmit the sensor data to a cloud service platform via the network 355. The network transceiver 350 may communicate with the network 355 via wired network, wireless network, cellular network, short-wave radio, etc. In an example, the network transceiver 350 may use MQTT and a publish-subscribe model to reduce network utilization and power consumption.

The network transceiver 350 may receive instructions from the cloud service platform which may be placed in the storage 320 and memory 315. When executed, the instructions may cause the processor 310 to perform operations to adjust (e.g., via the input/output controller 330, etc.) an operating parameter of an electronic device that includes the sensor controller 305. For example, ambient light sensor data may be transmitted to the cloud service platform and instructions may be received the adjust a lighting device of the electronic device upon receipt of a signal from an external device. For example, a signal may be received from a smart lighting switch in a hospital room and upon receipt of a signal indicating the ambient lighting of the hospital room has been lowered, instructions to lower or turn off a floor lighting component of the electronic device may be triggered. In another example, the instructions may include a lighting schedule and power to the lighting component may be adjusted based on the lighting schedule.

Figure 4:
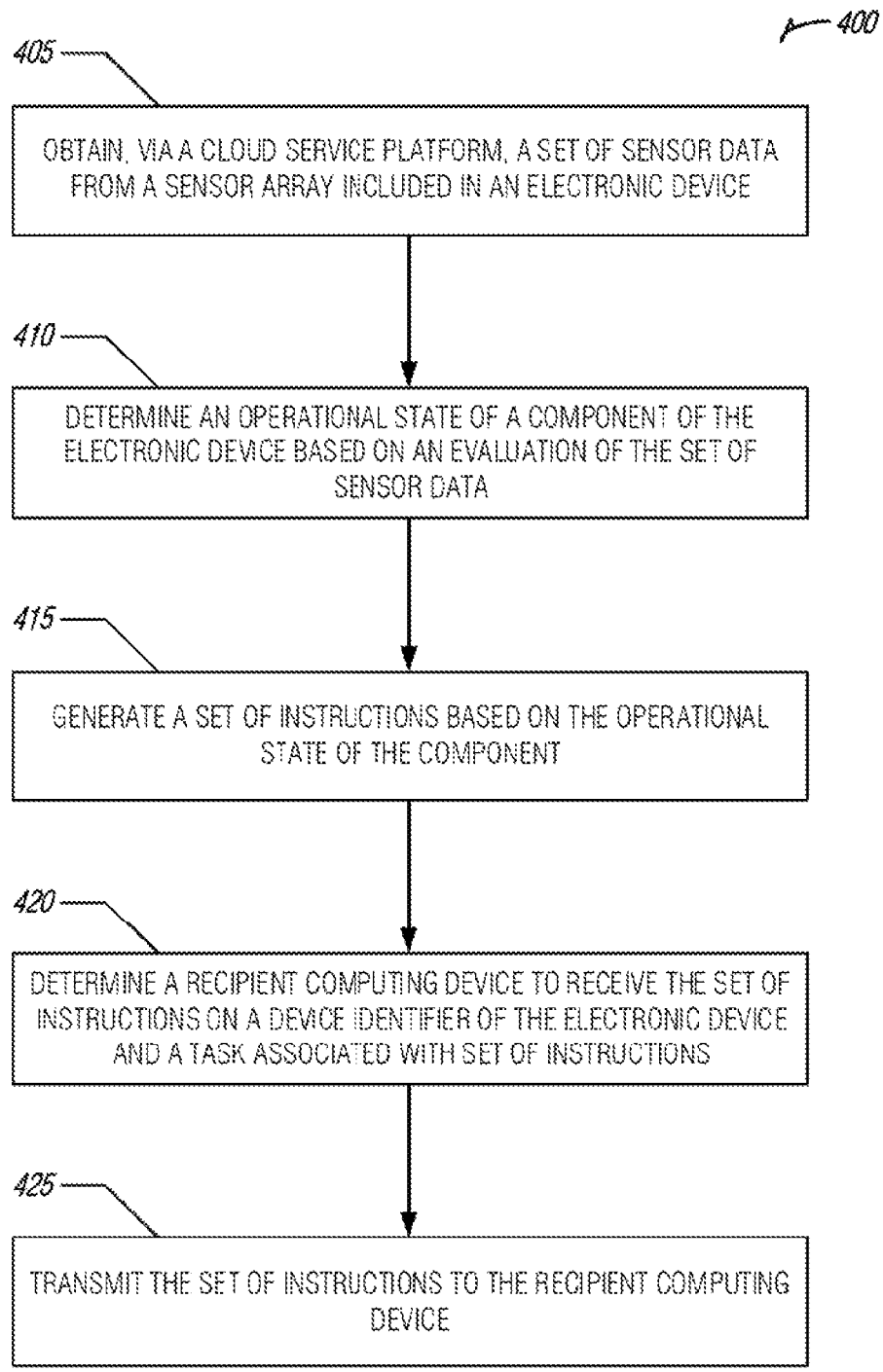
FIG. 4 illustrates an example of a method for electronic telemetry-based monitoring of an electronic device, according to an embodiment.

FIG. 4 illustrates an example of a method 400 for accurate estimation of battery charge remaining in a mobile cart, according to an embodiment. The method 400 may provide features as described in FIGS. 1-3.

A set of sensor data may be obtained (e.g., by the input/output controller 135 as described in FIG. 1, etc.) via a cloud service platform from a sensor array included in an electronic device (e.g., at operation 405). In an example, the sensor array may include at least one sensor selected from a group comprising: a power state sensor, a voltage sensor, an electrical current sensor, a battery temperature sensor, an ambient temperature sensor, a battery capacity sensor, and a battery cycle sensor. In an example, the electronic device may be located in a medical treatment facility.

An operational state of a component of the electronic device may be determined (e.g., by the operational state detector 140 as described in FIG. 1, etc.) based on an evaluation (e.g., by the comparator 145 as described in FIG. 1, etc.) of the set of sensor data (e.g., at operation 410). In an example, the sensor array may include a cycle sensor for the component and the evaluation of the set of sensor data to determine the operational state of the component may include a comparison of a number of cycles of the component observed by the cycle sensor to a cycle threshold for the component. Upon a determination that the number of cycles is at least equal to the cycle threshold, the operational state of the component may be determined to be end-of-life.

In an example, a future failure of the component may be predicted based on the evaluation of the set of sensor data and the evaluation may include a comparison of the set of sensor data to a predictive failure model for the component. The set of instructions may include instructions for mitigation of the future failure.

A set of instructions may be generated (e.g., by the instructions set generator 150 as described in FIG. 1, etc.) based on the operational state of the component (e.g., at operation 415).

A recipient computing device may be determined (e.g., by the data communication router 155, etc.) to receive the set of instructions based on a device identifier of the electronic device and a task associated with set of instructions (e.g., at operation 420). In an example, the recipient device may be a portable device associated with the device identifier and the set of instructions may include instructions that cause the portable device to display operational data for the electronic device that includes the operational state of the component. In another example, the recipient device may be a computing device associated with an owner of the electronic device based on the device identifier and the set of instructions may include instructions that cause the computing device associated with the owner to store operational data for the electronic device that include the operational state of the component. In yet another example, the recipient device may be a customer relationship management computing device and the set of instructions may include instructions that cause the customer relationship management computing device to store operational data for the electronic device that includes the operational state of the component in a record associated with an owner of the electronic device based on the device identifier.

The set of instructions may be transmitted (e.g., by the input/output controller 135 as described in FIG. 1, etc.) to the recipient computing device (e.g., at operation 425). In an example, the set of instructions may include instructions to transmit an electronic order for a replacement component to a supplier of the component and the recipient computing device may be an order processing computing system of the supplier. In another example, the set of instructions may include instructions to transmit an electronic service workorder to a service provider of the electronic device based on the device identifier of the electronic device and the recipient computing device may be a workorder processing system of the service provider.

In an example, a set of fulfillment instructions and a set of record creation instructions may be generated based on the operational state of the component. An owner of the electronic device may be determined based on a device identifier of the electronic device. One or more fulfillment recipient computing devices to receive the set of instructions may be determined based on the device identifier and a task associated with set of instructions. At least a subset of the set of fulfillment instructions may be transmitted to the one or more fulfillment recipient computing devices and the set of record creation instructions may be transmitted to an owner support computing device of the owner and a customer relationship management computing device of a supplier of the electronic device.

In an example, a set of sensor data may be collected from a sensor array. The set of sensor data may describe the operating state of a component of a mobile electronic cart apparatus. The set of sensor data may be transmitted via a transceiver to a cloud service platform. A set of instructions may be received via the transceiver based on an evaluation of the set of sensor data and an operating parameter of the component may be adjusted using the set of instructions. In an example, the set of instructions may include an instruction to adjust the operating parameter of the component based on a signal from a device external to the mobile electronic cart apparatus. In an example, the sensor array may include an ambient light sensor and the set of instructions may include an instruction to adjust a power level applied to a lighting component of the mobile electronic cart apparatus based on receipt of the signal from the device external to the mobile cart apparatus.

Figure 5:
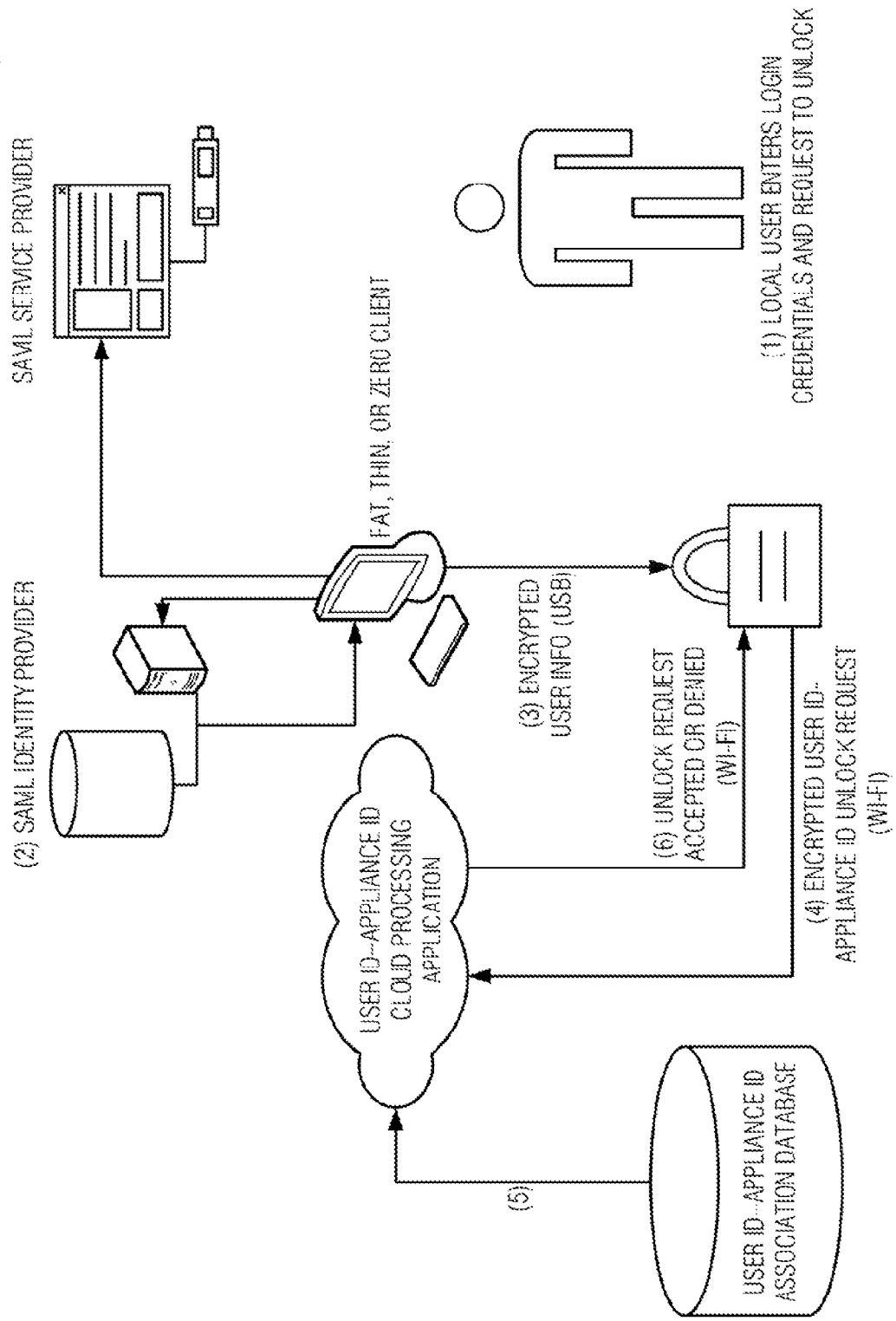
FIG. 5 illustrates an example of a system for associating a user with an electronic device, according to an embodiment.

FIG. 5 illustrates an example of a system 500 for associating a user with an electronic device, according to an embodiment. The problem to be solved is how to securely allow a user to get access to an appliance such as drawers on a medication delivery cart or similar structure whether fixed or mobile using a single-sign-on (SSO) method where the badge reader used by the user is not connected to a system of drawers but connected to a fat client, thin client, or zero client. The user's application program is running on the fat client, thin client, or zero client. SSO authentication system may be Security Access Markup Language (SAML) or similar federated method of authentication of a user allowing access to an application on the fat client, thin client, or zero client.

Accessing the system of drawers is historically done by connecting the fat client to the system of drawers with an application running that when authenticated, the user can select a drawer via an application on fat client and through a connection such as Universal Serial Bus (USB), the commands to open a drawer is sent to the system of drawers connected to the fat client and the transaction completes. The problem to be solved is the case of a thin client or zero client running a federated authentication service such as SAML where the server may be located thousands of miles from the thin or zero client and the system of drawers is located on a cart where the thin or zero client is located—but the thin or zero client may or may not be the same thin or zero client that was once associated with the system of drawers but moved to another cart or replaced due to maintenance reasons. The system 500 and corresponding methods associate a fat, thin, or zero client with a system of drawers that is physically residing on the same structure such as a cart where the user (such as a nurse) is needing to open a drawer on the same cart where the user's application is running on the fat, thin, or zero client also physically residing on the same structure such as a cart as the drawer system where the user is in order to perform the tasks associated with the application running on the fat, thin, or zero client and the system of drawers.

The system 500 and corresponding methods can have several elements, including:
1) A system of drawers or other appliance that is not under direct control of an application running on a fat, thin, or zero client.
2) A user that uses personally identifiable information stored on an access card (RFID), facial recognition, fingerprint recognition, or any other method of identification of a user connected to a fat client, thin client, or zero client in the proximity of the drawer system or appliance. A federated method of authentication such as SAML that utilizes the personal identification method of 2 that is running on the fat, thin, or zero client in proximity to the system of drawers or appliance.
3) A cloud-based database that holds the user's information related to access of the drawers or appliance.
4) A cloud-based database that holds the cart or structure's unique identification such as a serial number or other unique number associated with the cart or structure. The cart or structure is connected to the cloud via Wi-Fi, Ethernet, or other method of communication.
5) A cloud-based database with an association of the user and unique cart or structure identifiers that have the drawer or appliance attached. The database association may be many carts or structures for one user. Or there may be many users associated with 1 cart or structure associated with the drawer system or appliance. Or there may be many users associated with many carts or structures associated with the attached drawers or appliance.

6) A connection between the fat, thin, or zero client and the cart or structure where the connection is a physical connection through USB or other communication method. This connection provides the authenticated signal to the cart or structure, but another confirmation is needed to ensure the fat, thin, or zero client is in physical proximity to the user and the drawer or appliance.

7) A connection from the cloud-based database that associates a specific user and the specific cart or structure and the unique ID of the cart or structure where the drawer system or appliance is attached. Note that manual prompting of unique IDs of the cart-drawer system and unique IDs of the fat, thin, or zero client is not desirable due to data entry errors, spoofing, or accidental duplication during application program start-up. An automated ID method is hidden from users and people trying to spoof the system is desired.

As shown in FIG. 5, the user is authenticated on the fat, thin, or zero client using SAML or similar when the user uses a badge or other biometric identification and indicates access to the drawer or appliance is desired and if authenticated, an authentication message is sent to the cart or structure containing the drawer system via USB or similar direct connection between the fat, thin, or zero client. Because the fat, thin, or zero client may have been moved to another cart or structure, a way to ensure the system of drawers or appliance that the user was allowed access is maintained. For example, if originally approved for drawer system A and the fat, thin, or zero client was moved to cart or structure B with a different system of drawers or appliance that the user is not authorized to access, the process to open must stop and access denied. This is accomplished by a separate communications channel from the cloud-based database that associated the user and the cart or structure's drawer system unique ID.

During the access request and subsequent authentication, the application running on the fat, thin, or zero client sends the SAML information about the user to the cart or structure. The cart then sends the user-cart unique ID pair to the cloud-based user-cart association database. This is done securely. If the user-cart credentials match what is in the database, a message is returned to the cart that the user, the cart, and the drawers attached to the cart are all in the same physical location and access to the drawers can be completed by the user selecting the desired drawer to be unlocked. If the user-cart pair credentials do not match what is indicated as associated in the database, then a message is returned to the cart that the association between the cart-drawer system associated with the fat, thin, or zero client is not matched indicating that the drawers are not physically attached to the user's fat, thin, or zero client or the user is not in proximity and drawer access is denied.

This assures there is always a physical association with the user, the fat, thin, or thick client the user is logged in to, and the cart-drawer system physically attached to the user's fat, thin, or thick client.

Figure 6:
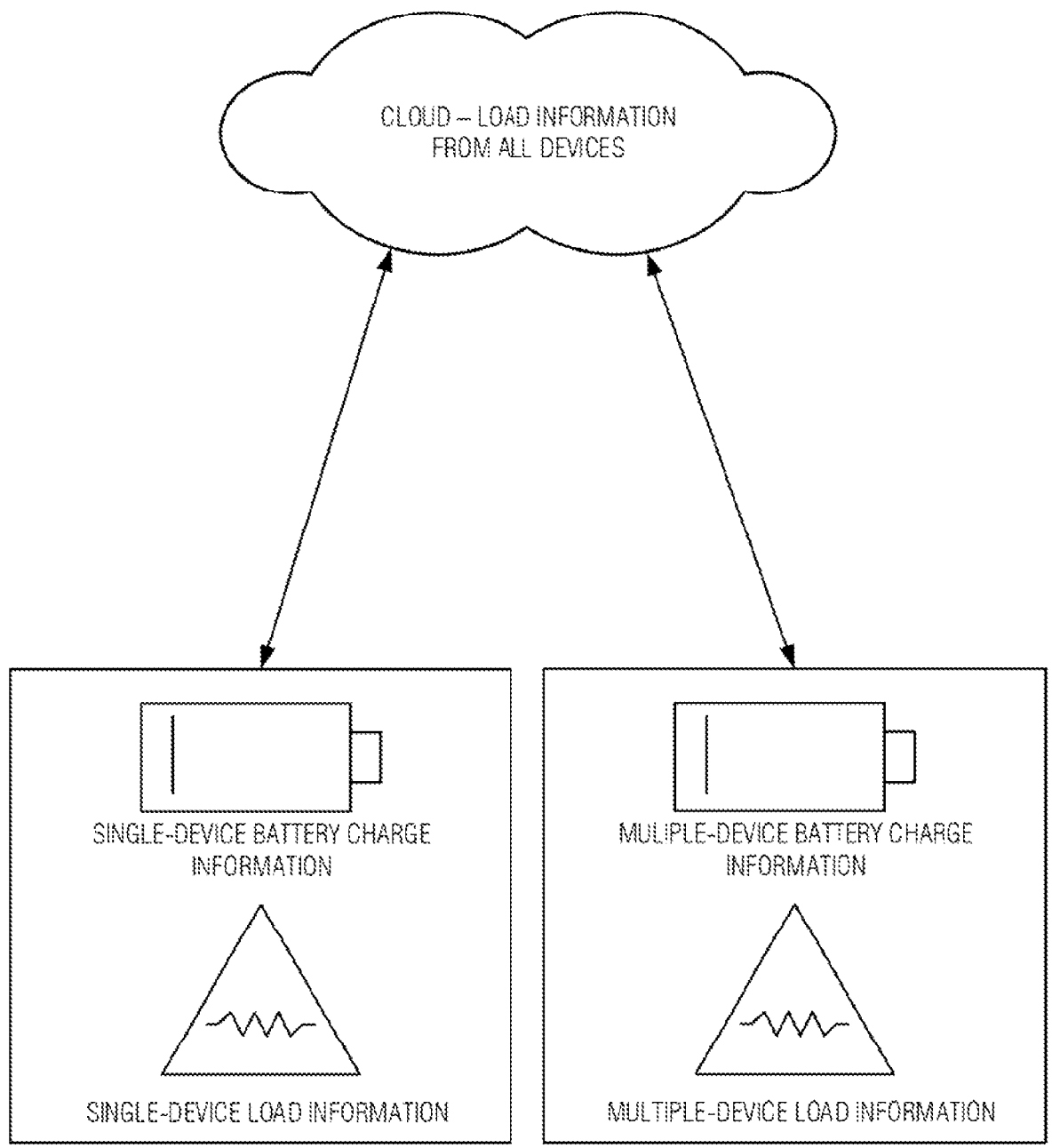
FIG. 6 illustrates an example of a system for accurate estimation of battery charge remaining in a mobile cart, according to an embodiment.

FIG. 6 illustrates an example of a system 600 for accurate estimation of battery charge time remaining in a mobile cart, according to an embodiment. The problem to be solved is that of displaying to the user of a power system providing alternating current (AC) or direct current (DC) power to a user's device such as a computer, monitor, or other peripheral where the actual load seen by the power source (e.g., battery located on the mobile cart) is not known, an accurate representation of the time remaining of the battery charge in a near instantaneous timeframe.

There are various methods of determining what battery charge time remains such as monitoring the current from the power system to the load for a period and calculating the charge time remaining of the battery. The issue is the load may be changing instantaneously or not changing at all or not present for a period. The charge time remaining of the battery can vary quite a bit because of these load changes to the point where the user has no confidence in the information and as a result may unnecessarily leave the device connected to a charging source or if a swappable battery, may change batteries prematurely resulting in more work for the user to keep what should be a relatively low-touch task of maintaining the device's battery level to an overly-complex and time-consuming task. Conversely, the user may leave the battery connected too long and run out of charge during a critical time the device is needed.

The system 600 and corresponding methods use the power of big data such that information of loads across an aggregate of devices that share similar use-cases is used to seed the device's anticipated load such that upon initial turn-on of a device there is a highly-probable load estimate in the devices power system memory which is used to calculate battery charge time remaining. Shortly after power up, the information seeded by the cloud to the device power system is updated with near real-time load information such that the battery charge time remaining is accurate without the need for the aggregate information from the population of similar devices in the cloud. Subsequently this individual device's load is stored in the cloud in a time series to be included with other similar devices in order to provide future start-up information on subsequent power-ups until the device can compute its own charge time remaining in near real-time. The benefit to the user is a realistic indication of time remaining on the battery charge almost instantaneously without having to wait between 10 and 30-seconds or more compared to other systems in use today.

As shown in FIG. 6, to solve the issue of first-time device usage where no information about the aggregate of all device's loads collected over a period of time exists, the devices are seeded from the factory with an estimated load profile based on the expected use case of typical systems loaded with devices typically seen by consumers of these types of products. Then, as the devices become more prolific in the population of devices, the aggregate load data of similar devices are seeded into the power system so on the next power-up, the battery charge time remaining is displayed based on the aggregate data until actual battery charge time remaining can be computed and displayed and the cycle repeats. The idea is that as the population increases and large amounts of load data is collected, the accuracy increases to the point of seeding is representing the near real-time information with high probability of accuracy.

Figure 7A:
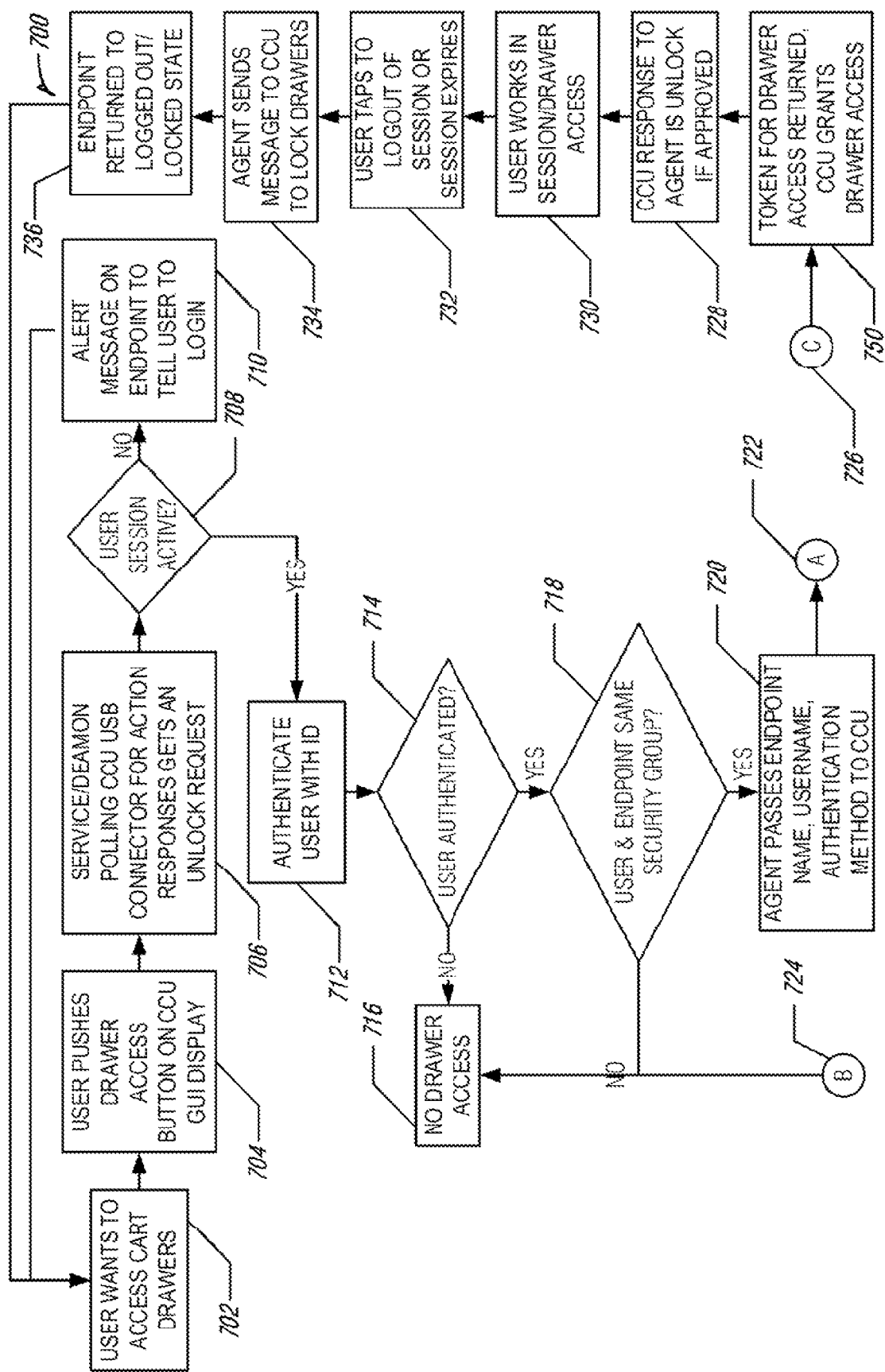
FIG. 7A is a flow diagram of an example of a process for access control of a mobile cart, according to an embodiment.
Figure 7B:
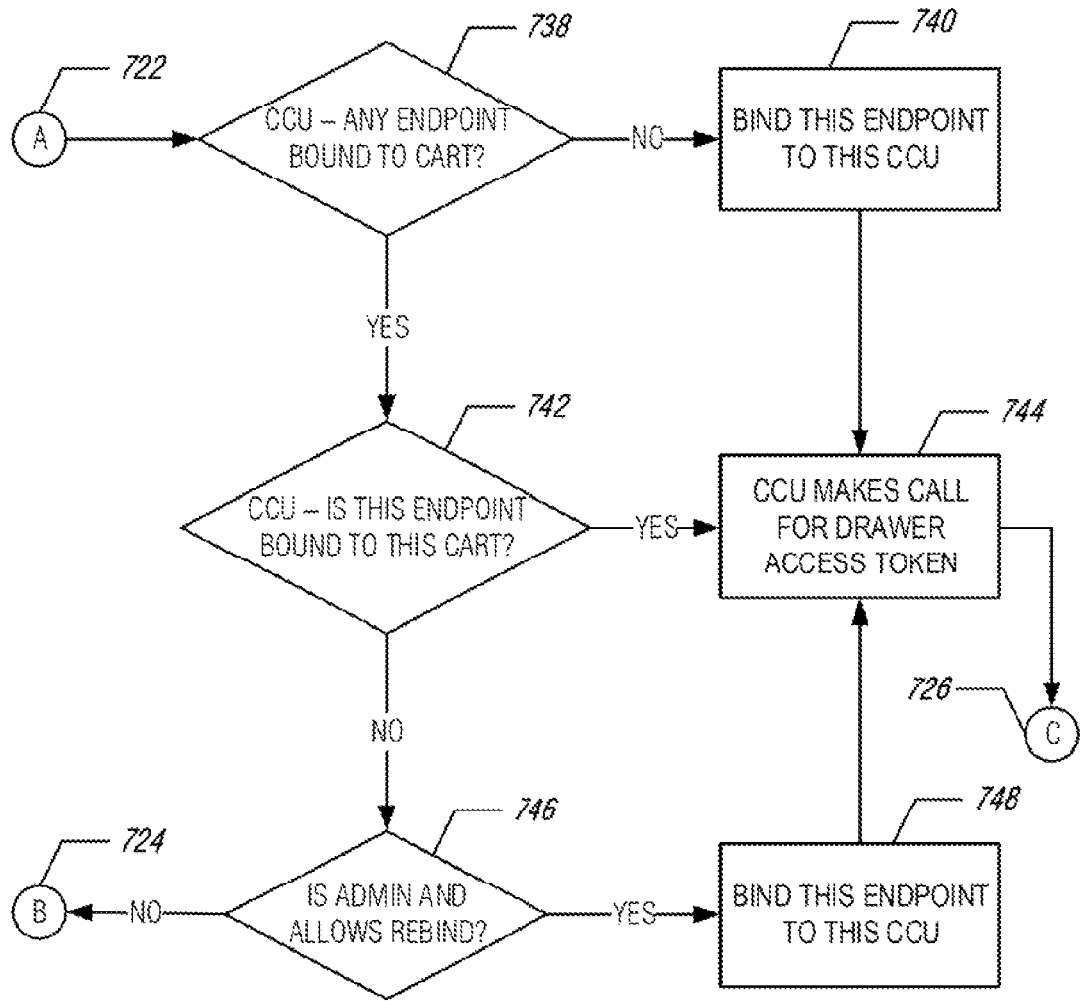
FIG. 7B is a flow diagram of an example of a process for binding an endpoint to a mobile cart, according to an embodiment.

FIG. 7A is a flow diagram of an example of a process 700 for access control of a mobile cart, according to an embodiment. FIG. 7B is a flow diagram of an example of a process 705 for binding an endpoint to a mobile cart, according to an embodiment. The processes 700 and 705 may provide features as described in FIGS. 1-6.

At operation 702, a user may wish to access drawers on a mobile cart. At operation 704, the user pushes a drawer access button on a cart control unit (CCU) graphical user interface (GUI). At operation 706, a service or daemon polls the CCU universal serial bus (USB) connector for action responses and receives an unlock request. At decision 708, it is determined whether there is an active user session. If not, an alert message is displayed on the endpoint (e.g., on the mobile cart via the GUI) requesting the user to login at operation 710 and the process continues to operation 702.

If there is an active user session as determined at operation 708, the user is authenticated with a user identifier (ID) at operation 712. It is determined if the user has been authenticated at decision 714. If not, drawer access is denied at operation 716. If the user is authenticated as determined at decision 714, it is determined if the user and the endpoint are in the same security group at decision 718. If not, drawer access is denied at operation 716. If it is determined that the user and the endpoint are in the same security group at decision 718, an agent passes an endpoint name, username, and authentication method to the CCU at operation 720 and the process continues at 722 to a binding process (e.g., as described in FIG. 7B).

Turning to FIG. 7B, the agent passes an endpoint name, username, and authentication method to the CCU from operation 720 through 722. For example, a computer name for a nurse user of a cart to be bound to the computer may be stored in the cart CCU electrically erasable programmable read-only memory (EEPROM). The CCU will use this to authenticate that the cart is bound to the computer and the user badging in (e.g., the nurse user, etc.) has been granted access to the drawers on the cart. It is determined by the CCU if any endpoint is bound to the cart at decision 738. If not, the endpoint is bound to the CCU at operation 740. This mechanism will bind computer to a fresh (e.g., unbound, new, etc.) cart. For example, when the agent (e.g., computer of the nurse, etc.) sends the computer name to the CCU for the first time the CCU stores the name in EEPROM only if EEPROM is empty. If it is determined that an endpoint is bound to the cart at decision 738, it is determined if the current endpoint is bound to the cart at decision 742. If not, it is determined at decision 746 whether the user is an administrator and is allowed to rebind the cart. If not, processing continues back to 724 and access to the drawer is denied at operation 716 as described in FIG. 716. If it is determined that rebinding is allowed at decision 746, the endpoint is bound to the CCU at operation 748. This mechanism allows a user to re-bind a computer to a cart. For example, when an admin user badges in, the agent sends a command to the CCU to overwrite the current computer name into EEPROM. If a normal user badges into the CCU and the computer does not match it will reject access to the drawers. If it is an admin user, they can rebind and/or allow access. When the endpoint has been determined to be bound to the CCU at decision 742 or is bound to the CCU at one of operations 740 or 748, the CCU calls for a drawer access token at operation 744 and processing continues at 726 to process 700 as described in FIG. 7A.

Returning to the description of FIG. 7A, the binding process 705 described in FIG. 7B calls for a drawer access token at operation 744 which is received at 726. At operation 750, a token for drawer access is returned and the CCU grants access to the drawer of the cart. At operation 728, the CCU sends a response to the agent to unlock the drawer if approved. At operation 732, the user logs out of the CCU via the GUI or the session of the user expires. At operation 734, the agent sends a message to the CCU to lock the drawers of the cart. At operation 736, the endpoint is returned to a logged out or locked state. The process 700 continues at operation 702 for subsequent drawer access requests.

Figure 8:
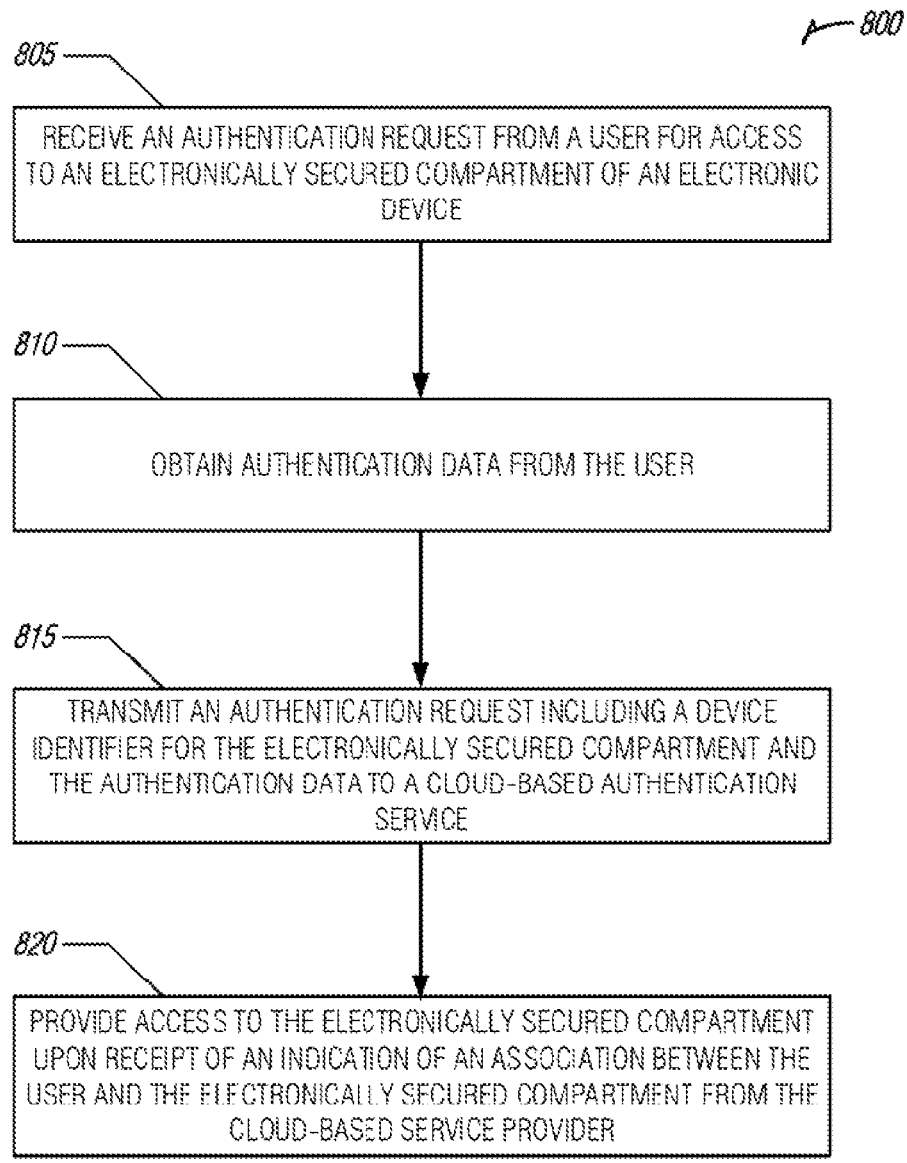
FIG. 8 illustrates an example of a method for associating a user with an electronic device, according to an embodiment.

FIG. 8 illustrates an example of a method 800 for associating a user with an electronic device, according to an embodiment. The method 800 may provide features as described in FIGS. 1 to 6, 7A and 7B.

At operation 805, an authentication request is received from a user for access to an electronically secured compartment of an electronic device. In an example, the authentication request is received via a graphical user interface of a control unit included with the electronic device. At operation 810, authentication data is obtained from the user. At operation 815, an authentication request that includes a device identifier for the electronically secured compartment and the authentication data is transmitted to a cloud-based authentication service. In an example, the authentication request includes an identifier of a computing device of the user, a username of the user and an authentication method for the authentication request. At operation 820, access to the electronically secured compartment is provided upon receipt of an indication of an association between the user and the electronically secured compartment from the cloud-based service provider. In an example, an access token is requested using the authentication data and an endpoint name of the user and access is provided to the electronically secured compartment upon validation of the access token. In another example, the indication of an association between the user and the electronically secured compartment includes an electronically stored record in memory of the electronic device that identifies that the electronic device is bound to a computing device of the user.

In an example, it is determined that the electronic device is unbound from a computing device of the user. The cloud-based service provider may validate that the user is authorized to bind the electronic device to the computing device. Upon validation, the electronic device is bound to the computing device and access is provided to the electronically secured compartment upon determination that the electronic device is bound to the computing device.

In an example, the cloud-based service provider may determine that a session time has expired for the user and the electronic device is placed in a locked state that prevents access to the electronically secured compartment.

Figure 9:
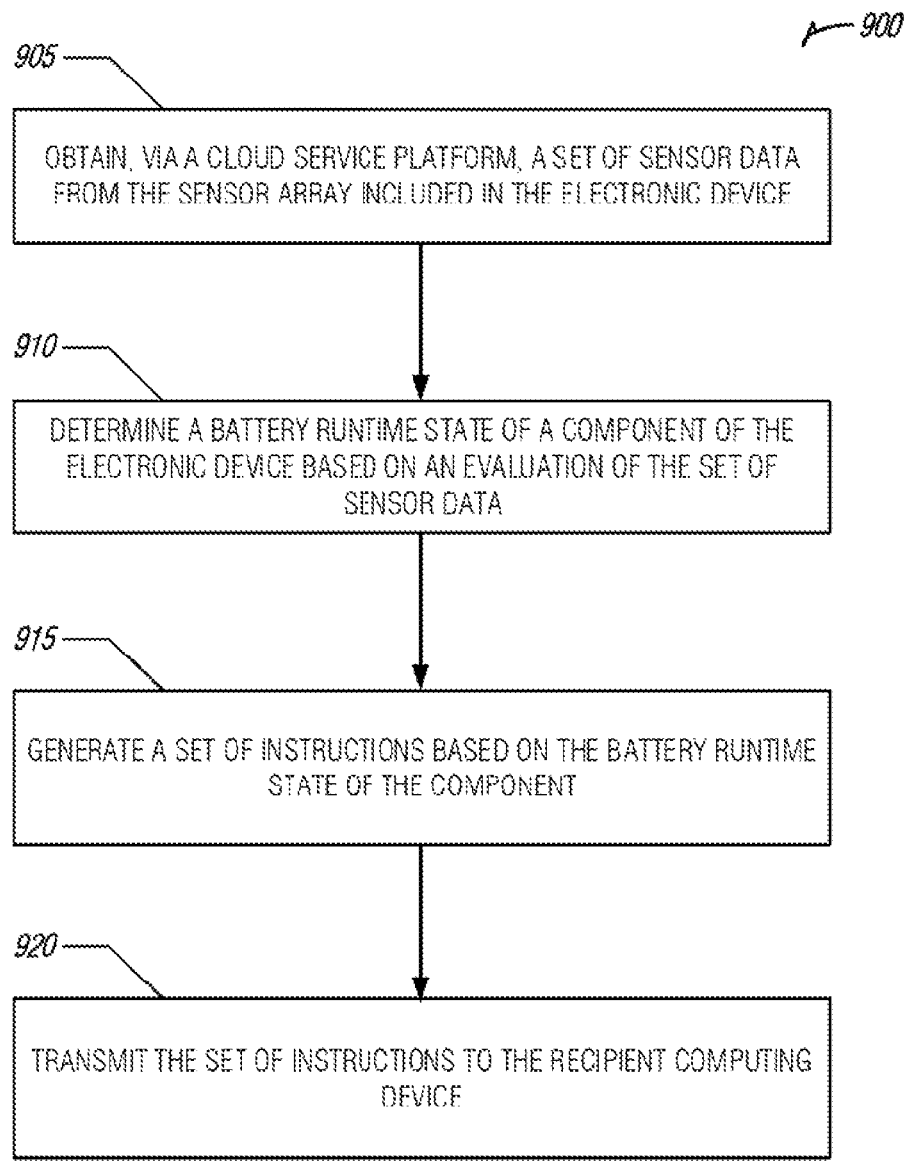
FIG. 9 illustrates an example of a method for electronic telemetry-based monitoring of an electronic device, according to an embodiment.

FIG. 9 illustrates an example of a method 900 for electronic telemetry-based monitoring of an electronic device, according to an embodiment. The method 900 may provide features as described in FIGS. 1 to 6, 7A and 7B.

At operation 905, a set of sensor data is obtained via a cloud service platform from a sensor array included in an electronic device. At operation 910, a battery runtime state of a component of the electronic device is determined based on an evaluation of the set of sensor data. At operation 915, a set of instructions is generated based on the battery runtime state of the component. In an example, the set of instructions modify power consumption of the electronic device. At operation 920, the set of instructions is transmitted to a recipient computing device.

Immediate sensor data may not be available for newly installed devices so data from other devices may be used to establish an estimated runtime state for the electronic device. In an example, it is determined that a battery runtime state cannot be determined using the set of sensor data. A configuration is identified for the electronic device. Historical sensor data is retrieved from a set of electronic devices connected to the cloud service platform based on the configuration and the battery runtime state is calculated for the electronic device using the historical sensor data. When the electronic device has collected enough sensor data, the runtime state may be recalculated. In an example, a second set of sensor data may be obtained from the sensor array included in the electronic device and the battery runtime state is recalculated using the second set of sensor data.

In an example, a charge time is calculated for the electronic device based on the battery runtime state and an electrical draw on a battery of the electronic device. The charge time may be output for display to in a graphical user interface. In an example, the electrical draw is determined based on a load profile of the electronic device. In an example, a use case is determined for the electronic device. A set of peer electronic devices connected via the cloud service platform is identified that share the use case. Load data of the set of peer devices is evaluated to establish the load profile.

Figure 10:
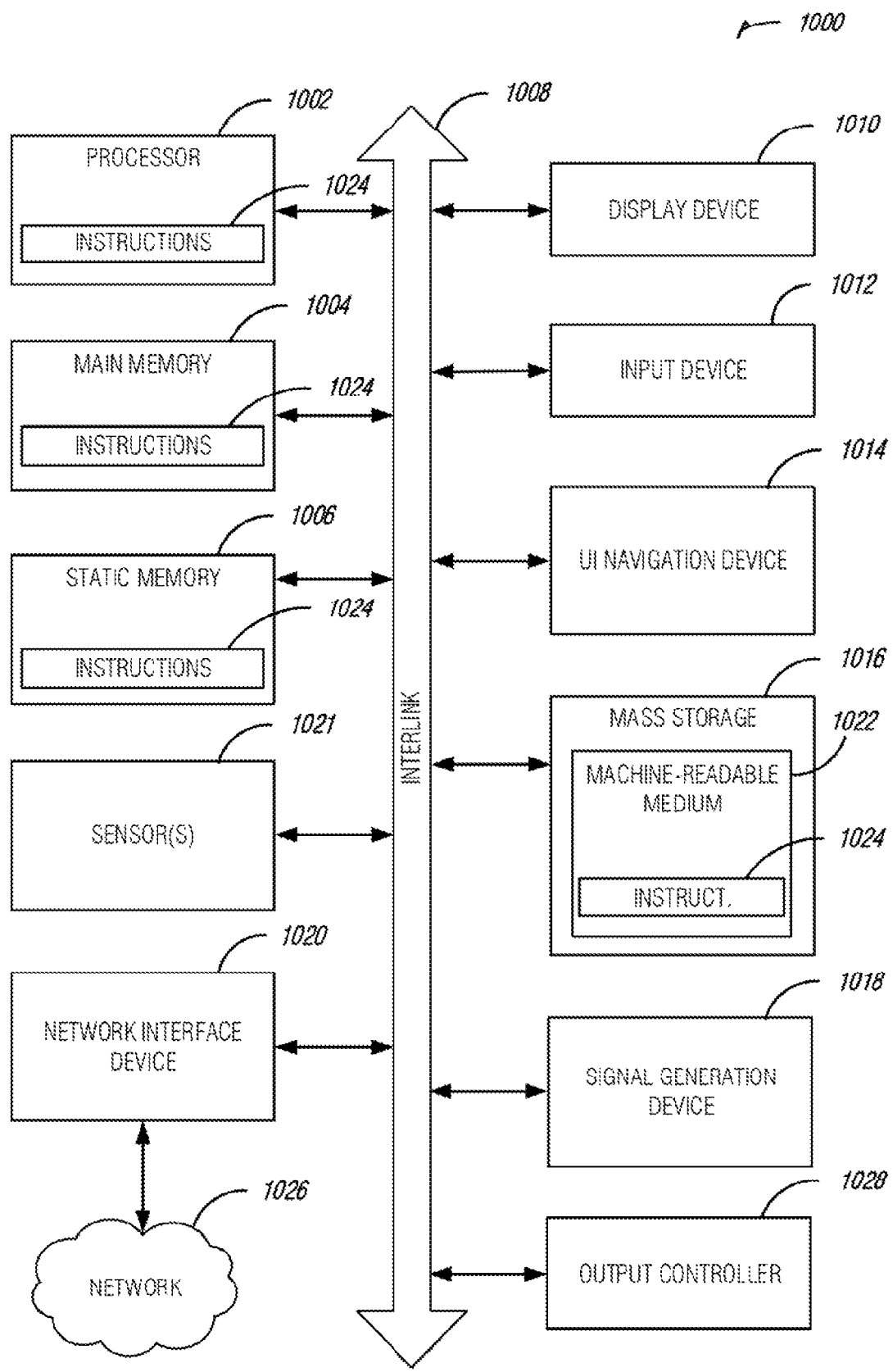
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensors. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, 3$^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

What is claimed is:

1. A system for associating a user with an electronic device comprising:
   at least one processor; and
   memory including instructions that, when executed by the at least one processor, cause the at least one processor to perform operations to:
      receive an authentication request from a user for access to an electronically secured compartment of the electronic device, the electronic device having a first compartment configuration;
      determine that the user is authenticated with a previous electronic device having a second configuration;
      request authentication data from the user;
      obtain authentication data from the user;
      transmit an authentication request including a device identifier for the electronically secured compartment and the authentication data to a cloud-based authentication service; and
      upon receipt of an indication that user access to the previous electronic device having the second configuration permits the user to access the electronically secured compartment of the electronic device, provide access to the electronically secured compartment upon receipt of an indication of an association between the user and the electronically secured compartment from the cloud-based authentication service.

2. The system of claim 1, the memory further comprising instructions that, when executed by the at least one processor, cause the at least one processor to perform operations to:
   determine that the electronic device is unbound from a computing device of the user;
   validate that the user is authorized to bind the electronic device to the computing device;
   upon validation, bind the electronic device to the computing device; and
   provide access to the electronically secured compartment upon determination that the electronic device is bound to the computing device.

3. The system of claim 1, the memory further comprising instructions that, when executed by the at least one processor, cause the at least one processor to perform operations to:
   request an access token using the authentication data and an endpoint name of the user, wherein access is provided to the electronically secured compartment upon validation of the access token.

4. The system of claim 1, the memory further comprising instructions that, when executed by the at least one processor, cause the at least one processor to perform operations to:
   determine that a session time has expired for the user; and
   place the electronic device in a locked state that prevents access to the electronically secured compartment.

5. The system of claim 1, wherein the authentication request is received via a graphical user interface of a control unit included with the electronic device.

6. The system of claim 1, wherein the indication of an association between the user and the electronically secured compartment includes an electronically stored record in memory of the electronic device that identifies that the electronic device is bound to a computing device of the user.

7. The system of claim 1, wherein the authentication request includes an identifier of a computing device of the user, a username of the user and an authentication method for the authentication request.

8. A method for associating a user with an electronic device comprising:
   receiving an authentication request from a user for access to an electronically secured compartment of the electronic device;
   determining that the user is authenticated with a previous electronic device having a second configuration;
   requesting authentication data from the user;
   obtaining authentication data from the user;
   transmitting an authentication request including a device identifier for the electronically secured compartment and the authentication data to a cloud-based authentication service; and
   upon receiving an indication that user access to the previous electronic device having the second configuration permits the user to access the electronically secured compartment of the electronic device, providing access to the electronically secured compartment upon receipt of an indication of an association between the user and the electronically secured compartment from the cloud-based authentication service.

9. The method of claim 8, further comprising:
   determining that the electronic device is unbound from a computing device of the user;
   validating that the user is authorized to bind the electronic device to the computing device;
   upon validation, binding the electronic device to the computing device; and
   providing access to the electronically secured compartment upon determination that the electronic device is bound to the computing device.

10. The method of claim 8, further comprising:
    requesting an access token using the authentication data and an endpoint name of the user, wherein access is provided to the electronically secured compartment upon validation of the access token.

11. The method of claim 8, further comprising:
    determining that a session time has expired for the user; and placing the electronic device in a locked state that prevents access to the electronically secured compartment.

12. The method of claim 8, wherein the authentication request is received via a graphical user interface of a control unit included with the electronic device.

13. The method of claim 8, wherein the indication of an association between the user and the electronically secured compartment includes an electronically stored record in memory of the electronic device that identifies that the electronic device is bound to a computing device of the user.

14. The method of claim 8, wherein the authentication request includes an identifier of a computing device of the user, a username of the user and an authentication method for the authentication request.

15. At least one non-transitory machine-readable medium comprising instructions for associating a user with an electronic device that, when executed by at least one processor, cause the at least one processor to perform operations to:
receive an authentication request from a user for access to an electronically secured compartment of the electronic device;
determine that the user is authenticated with a previous electronic device having a second configuration;
request authentication data from the user;
obtain authentication data from the user;
transmit an authentication request including a device identifier for the electronically secured compartment and the authentication data to a cloud-based authentication service; and
upon receipt of an indication that user access to the previous electronic device having the second configuration permits the user to access the electronically secured compartment of the electronic device, provide access to the electronically secured compartment upon receipt of an indication of an association between the user and the electronically secured compartment from the cloud-based authentication service.

16. The at least one non-transitory machine-readable medium of claim 15, further comprising instructions that, when executed by the at least one processor, cause the at least one processor to perform operations to:
determine that the electronic device is unbound from a computing device of the user;
validate that the user is authorized to bind the electronic device to the computing device;
upon validation, bind the electronic device to the computing device; and
provide access to the electronically secured compartment upon determination that the electronic device is bound to the computing device.

17. The at least one non-transitory machine-readable medium of claim 15, further comprising instructions that, when executed by the at least one processor, cause the at least one processor to perform operations to:
request an access token using the authentication data and an endpoint name of the user, wherein access is provided to the electronically secured compartment upon validation of the access token.

18. The at least one non-transitory machine-readable medium of claim 15, further comprising instructions that, when executed by the at least one processor, cause the at least one processor to perform operations to:
determine that a session time has expired for the user; and
place the electronic device in a locked state that prevents access to the electronically secured compartment.

19. The at least one non-transitory machine-readable medium of claim 15, wherein the authentication request is received via a graphical user interface of a control unit included with the electronic device.

20. The at least one non-transitory machine-readable medium of claim 15, wherein the indication of an association between the user and the electronically secured compartment includes an electronically stored record in memory of the electronic device that identifies that the electronic device is bound to a computing device of the user.

* * * * *

UNITED STATES PATENT AND TRADEMARK OFFICE
CERTIFICATE OF CORRECTION

| | |
|---|---|
| PATENT NO. | : 12,078,684 B2 |
| APPLICATION NO. | : 18/233711 |
| DATED | : September 3, 2024 |
| INVENTOR(S) | : Tischer et al. |

Page 1 of 1

It is certified that error appears in the above-identified patent and that said Letters Patent is hereby corrected as shown below:

In the Specification

In Column 4, Line 60, delete "120" and insert --125-- therefor

In Column 5, Line 5, delete "145," and insert --150,-- therefor

In Column 9, Line 2, delete "instructions" and insert --instruction-- therefor

In Column 16, Line 26, delete "machine readable" and insert --machine-readable-- therefor In Column 16, Line 37, delete "machine readable" and insert --machine-readable-- therefor In Column 16, Line 38, delete "machine readable" and insert --machine-readable-- therefor In Column 16, Line 39, delete ""machine readable" and insert --"machine-readable-- therefor In Column 16, Line 44, delete ""machine readable" and insert --"machine-readable-- therefor In Column 16, Lines 50-51, delete "machine readable" and insert --machine-readable-- therefor In Column 16, Line 53, delete "machine readable" and insert --machine-readable-- therefor Signed and Sealed this
Tenth Day of June, 2025

Coke Morgan Stewart
*Acting Director of the United States Patent and Trademark Office*